Aug. 16, 1966   G. ABRAMSON, JR   3,266,185

FISH LURE

Filed July 3, 1964

INVENTOR.
GEORGE ABRAMSON JR.
BY Noel T. Conway
ATTORNEY 3,266,185
FISH LURE
George Abramson, Jr., 2916 W. Borchard Ave.,
Santa Ana, Calif.
Filed July 3, 1964, Ser. No. 380,175
10 Claims. (Cl. 43—35)

This invention relates to a new fish lure, and more particularly to a fish lure having fish hooks which are normally in a retracted position, which hooks may be extended upon the striking of the fish to snag the fish.

A principal use for fish lures made in accordance with the present invention is in fishing in waters which are congested with weeds and other obstructions. In such case, it is desirable that the hooks be retracted within the body of the fish lure, in order that they not snag on underwater objects. However, when the fish strikes the lure, it is desired that the hooks extend to snag the fish.

Fish lures having retractable hooks have been previously proposed, such as in Patent No. 1,209,237. However, such fish lures have the disadvantage that specially bent hooks must be used. Fish lures made in accordance with the present invention may be constructed with conventional straight shank hooks.

Further, it has been found that it is advantageous to have the hook to be moved forwardly relative to the lure body as the hook is swung to the extended position. This action facilitates the snagging of the fish which has struck the lure.

With the foregoing in mind, it is a major object of the present invention to provide a fish lure particularly suited for use in water having weeds and other obstacles.

Another object of this invention is to provide a fish lure having extendable hooks, which hooks are moved forwardly in the body of the lure as the hooks are extended.

A further object of this invention is to provide a simple fish lure having selectively extendable hooks.

Still another object of this invention is to provide a fish lure which may be economically manufactured and assembled from low cost parts.

Still a further object of this invention is provide a fish lure having fish hooks which are selectively extended by cam surfaces in the lure body engaging the hooks.

Still another object of this invention is to provide a fish lure incorporating conventional straight shank hooks, which lure has means to swing the hooks between a retracted position and an extended position.

Other and further objects of this invention will become apparent in the detailed description below in conjunction with attached drawings, wherein.

Figure 1:
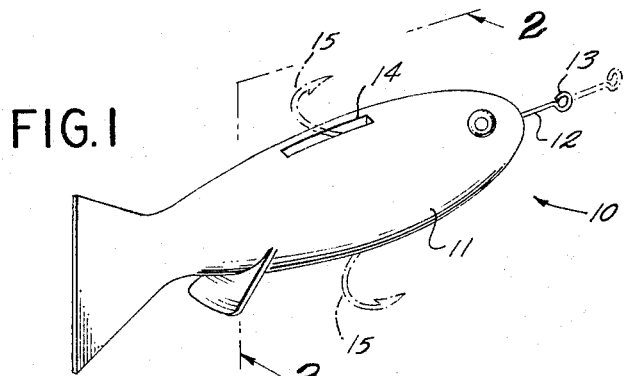
FIGURE 1 is a pictorial view of a preferred embodiment of a fish lure incorporating my present invention.

Referring now to the drawings, in FIGURE 1 there is shown a fish lure, indicated generally by the arrow 10, comprising an elongated body 11. Extending out of the forward end of the body 11 is an attachment shaft 12 having an eye 13 at its forward end adapted to be connected to the fish line.

As will be explained in further detail below, there are side openings 14 at either side of the body 11. And, when the attachment shaft 12 is moved forwardly relative to the body 11 hooks are extended out of the side openings 14 to a position shown by phantom lines 15 in FIGURE 1. The preferred manner for accomplishing this is described in detail below. However, at this time it should be noted that when a fish strikes the lure 10 and attempts to pull the lure 10 away from the angler, the striking of the fish causes the shaft 12 to move forwardly relative to the body 11. This action causes the hooks to extend and snag the fish.

Referring now to FIGURES 2 to 5, the preferred manner of effecting the movements of the hooks will be described in detail.

Figure 2:
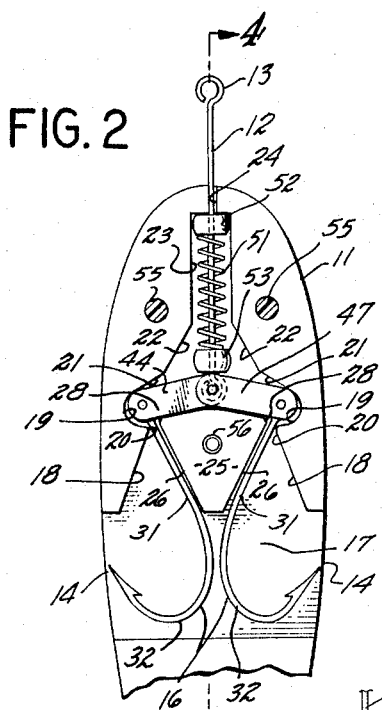
FIGURE 2 is a fragmentary cross sectional view of the fish lure taken along line 2—2 in FIGURE 1 with the hooks in the retracted position.
Figure 3:
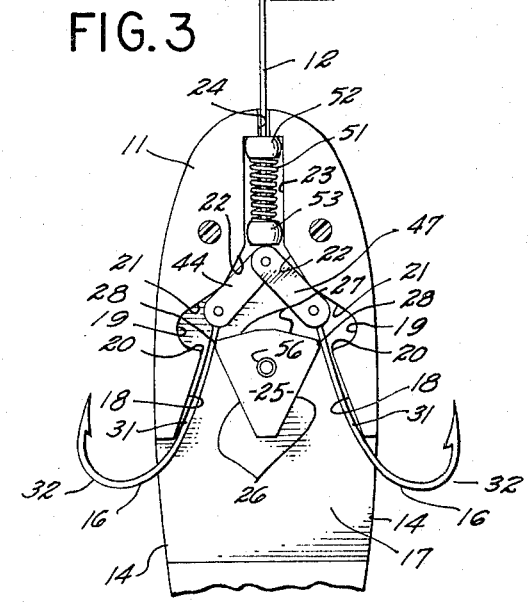
FIGURE 3 is a fragmentary cross sectional view of the fish lure in FIGURE 2 with the hooks in the extended position.
Figure 4:
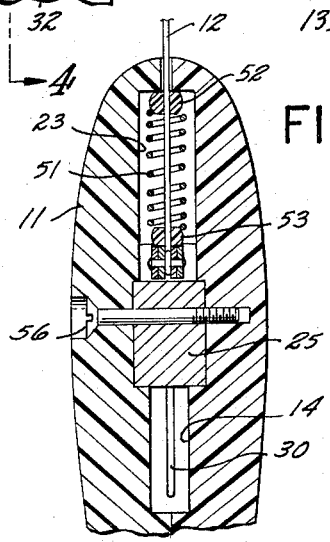
FIGURE 4 is a cross-sectional view of the fish lure taken along line 4—4 in FIGURE 2.

In FIGURE 2, hooks 16 are shown in the retracted position substantially within the cavity 17. In this figure, it can be seen that there is disposed within the body 11 a cavity 17. The cavity 17 has side walls 18 which taper forwardly with recesses 19 adjoining the side walls at cam points 20. On the forward side of the recesses 19 are a pair of cam surfaces 21 which function in a manner to be described. At the forward side of the cam surfaces 21, side walls 22 of the cavity 17 taper forwardly and terminate in a rearwardly facing bore 23 which receives the shaft 12. It will be noted that the shaft 12 is held for sliding movement in a guide 24.

Disposed within the cavity 17 is a central block 25. The block 25 has a pair of rearwardly tapering sidewalls 26 which function in a manner to be described. It will be noted that the block 25 has a forward edge 27 approximately opposite and slightly forward of the rear side of the recesses 19, which forward edge extends outwardly and rearwardly from the center positon. As will be explained in greater detail below, the forward edge 27 functions in retracting the hooks 16 of the fish lure. Before leaving the description of the central block 25 it should be noted that a pair of cam surfaces, or points, 28 are provided at the intersection of the respective sidewalls 26 and the forward edge 27. The cam surfaces 28 function in extending the hooks in a manner to be described.

Referring now to the moving components of the fish lure 10, each of the hooks 16 disposed in the cavity 17 has a straight shank 31 extending generally longitudinally of the body 11. At the rear end of the shanks 31 is an outwardly curving hook or bight portion 32 while at the forward end of each shank 31 is located an eye 33.

Figure 5:
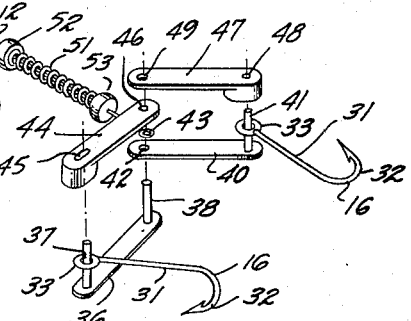
FIGURE 5 is an exploded view of the moving components of the fish lure.

The preferred mechanism which operatively connects the movement of the attachment shaft 12 to the hooks can best be seen in FIGURE 5. There it can be seen that a first bottom link 36 has a pair of upstanding pins 37 and 38 with the eye 33 of the left hand hook 16 being received over the pin 37. A second bottom link 40, having an upstanding pin 41 at one end, is provided with a hole 42 through which is received the pin 38. It will be noted that the pin 38 also extends upwardly through eye 43 on the rearward end of the shaft 12. Similarly, it can be seen that the upstanding pin 41 receives there over the eye 33 of the right hand hook 16.

Extending parallel to the bottom link 36 is a styrene retainer link 44 having holes 45 and 46 through which the upstanding pins 37 and 38 respectively are received. The wall of the hole 45 frictionally engages the pin 37 to facilitate assembling the unit.

Extending parallel to the bottom link 40 is a retainer link 47 having holes 48 and 49 at either end. The wall of the hole 48 frictionally engages the upstanding pin 41 in order to facilitate assembling the unit while the hole 49 receives therethrough the pin 38 on the link 36.

As will be described in further detail below, it is desired that the attachment shaft 12 be biased to its rearward position where the hooks 16 are moved to a retracted position. To this end there is provided in the bore 23 a return spring 51 having bushings 52 and 53 at either end. Therefore, the return spring 51 urges the moving components rearwardly and causes the hooks 16 to retract in the manner to be described.

It will be noted that the preferred embodiment is particularly well suited for rapid construction. First, the various moving components are assembled together. Then, with one of the halves of the body 11 removed, the moving components may be dropped into the position shown. At this point, the removed half of the body 11 is reinstalled in its position wherein index lugs 55 function to hold the two halves in proper orientation. At this point, a screw 56 is used to hold the body 11 together.

In operation, the hooks 16 are maintained in the retracted position shown in FIGURE 2 as follows. The return spring 51 urges the bushing 53, and therefore the links 36, 40, 44 and 47 rearwardly. Engagement of the forward edge 27 of the block 25 cams the rearward ends of the links 36, 40, 44 and 47 outwardly into the recesses 19. As the eyes 33 of the hooks 16 are moved outwardly into the recesses 19, the shanks 31 are engaged by cam points 20, causing the hook portions 32 of the hooks to be swung inwardly until the shanks 31 engage the sidewalls 26 on the block 25. At this point each of the links 36, 40, 44 and 47 extend from their respective inward ends outwardly and rearwardly.

When a fish strikes the lure 10, it pulls the lure away from the fisherman, whereupon the hooks 16 are moved forwardly and swung outwardly in the manner which will now be described. As the shaft 12 is moved forwardly relative to the body 11 the inward ends of the links 36, 40, 44 and 47 are also moved forwardly. The outward ends of the links 36, 40, 44 and 47 and the eyes 33 of the hooks 16 engage the cam surfaces 21 whereupon these moving components are cammed inwardly by a further forward movement of the attachment shaft 12. As the eyes 33 of the hooks 16 are cammed inwardly, the shanks 31 engage cam surfaces 28 at the junctions of forward edge 27 with the block sidewalls 26. Further forward movement causes the hooks 16 to swing about the cam surfaces 28 whereupon the rear hook portions 32 are swung to the extended position shown in FIGURE 3 as the hooks are moved forward. The hooks 16 are limited in their outward movement by engagement of the shanks 31 with the cavity sidewalls 18.

When the tension is removed from the attachment shaft 12, the return spring 51 urges the links 36, 40, 44 and 47, as well as the hooks 16 rearwardly, whereupon the eyes 33 of the hooks are moved back into the recesses 19 in the cavity sidewalls and the hook portions 32 are swung back into the retracted position shown in FIGURE 2.

While only one embodiment of my present invention has been shown and described in detail, it will be apparent to those skilled in the art that such is by way of illustration only, and numerous changes may be made thereto without department from the spirit of the present invention. Accordingly, it is my intention that this invention should be limied solely by the scope of the appended claims.

I claim:

1. A fish lure comprising:
a body having a cavity formed therein;
attachment means for connecting said lure to a fishing line; a fish hook disposed at least partially within said cavity, said attachment means being mounted for longitudinal movement along the axis of said body, said hook having a shank extending generally longitudinally of the body with a bight portion at the rearward end of said shank;
positioning means including said attachment means for causing said fish hook to move from a retracted position substantially wholly within said cavity to an extended position where the bight portion projects outside the cavity when said attachment means is moved forward relative to said body, said positioning means moving the hook forward relative to the body as said attachment means is moved relative to the body, said positioning means including portions fixed to said body which cam the forward end of the shank inwardly as the hook is moved forward relative to the body, said positioning means including portions fixed to the body which engage the shank rearward of the forward end and prevent the shank at that engaged point from moving inwardly as the hook is moved forward relative to the body, whereby the rearward end of the body is moved to an extended position as the hook is moved forward relative to the body.

2. The fish lure set forth in claim 1 including: means normally biasing said hook toward said retracted position.

3. The fish lure set forth in claim 2 wherein said last mentioned means comprises resilient means urging a portion of said positioning means and said hook rearwardly.

4. A fish lure comprising:
a body having an axis and a cavity therein; attachment means for connecting said lure to a fishing line, said attachment means being movable forward and rearward along said axis;
a fish hook disposed at least partially within said cavity, said fish hook having a shank extending generally longitudinally of the body with a bight portion at the rearward end of said shank;
positioning means including said attachment means for causing said fish hook to move from a retracted position wholly within said cavity to an extended position where the bight portion projects outside of the cavity, said positioning means moving said hook forward relative to said body when said attachment means is moved forward relative to said body, said positioning means including first and second cam portions fixed to said body which portions apply force to the shank at different points and cause the rearward end of said shank to be swung outwardly as the shank is moved forward relative to those cam portions.

5. The fish lure set forth in claim 4 wherein said positioning means includes:
a third cam portion fixed to said body which cooperates with said first and second cam portions to swing the rearward end of said shank inward as the shank is moved rearwardly by said positioning means.

6. A fish lure comprising:
an elongated body having a longitudinal axis and a cavity formed therein;
an attachment shaft slidably received in said body and extending parallel to said axis, said shaft projecting out of the front end of said body;
a fish hook disposed at least partially within said cavity, said fish hook having the shank disposed generally longitudinally of the body with a bight portion at its rearward end;
a link connecting the forward end of said hook shank with said attachment shaft so that said hook moves forward and rearward with said shaft;
a first cam surface on said body disposed to apply force to the inward side of said shank at a first point thereon as the shank is moved forward relative to said body;
a second cam surface on said body disposed to apply force to the outward side of said shank at a second point thereon as the shank is moved forward relative to said body, said second cam surface being disposed forward of said first cam surface whereby the rearward end of said shank is swung outward as said hook is moved forward relative to said body.

7. The fishing lure set forth in claim 6, including: resilient means normally urging said attachment shaft rearwardly.

8. The fishing lure set forth in claim 6, including:
means on said body to cam the forward end of said shank outwardly relative to an intermediate portion of said shank as the hook is moved rearward relative to said body whereby the hook is moved to a retracted position as the attachment shaft is moved rearward relative to said body.

9. A fish lure comprising:

an elongated body having a longitudinal axis and a cavity therein;

a pair of fish hooks disposed at least partially within said cavity, each of said hooks having a shank extending generally longitudinally of the body with a bight portion at the rearward end of said shank;

an attachment shaft extending out of the forward end of said body parallel to said axis, said shaft being slidably mounted in said body;

a pair of links, each having a forward end operably connected to said shaft, and a rearward end operably connected to the forward end of the respective one of said hook shanks;

a block disposed in said cavity between said hook shanks; said cavity having side walls which taper forwardly;

a recess formed in each of said sidewalls at a point opposite the forward edge of said block;

said links being of such length relative to the cavity that when said shaft is moved rearward the rear ends of said links engage said block and are moved laterally outward into said recesses whereby the portions of said cavity sidewalls rearward of the recesses engage said hook shanks and swing the rearward end of the shanks inward to a retracted position;

portions of said cavity walls forward of said cavity recesses and said central block cooperating with said hooks and links to swing the rearward end of said hook shanks outward to an extended position as said attachment shaft is moved forward; and means resiliently urging said hook toward said retracted position.

10. The fishing lure set forth in claim 1 wherein said last mentioned means urges said shaft rearward relative to said body.

References Cited by the Examiner
UNITED STATES PATENTS 1,209,237   12/1916   Warren _____ 43—35

ABRAHAM G. STONE, *Primary Examiner.*

R. L. HOLLISTER, *Assistant Examiner.*